June 25, 1935.  C. E. SLAUGHTER  2,005,759
AUTOMATIC PROJECTOR
Filed May 4, 1931  4 Sheets-Sheet 1

Charles E. Slaughter
INVENTOR.

June 25, 1935.  C. E. SLAUGHTER  2,005,759
AUTOMATIC PROJECTOR
Filed May 4, 1931  4 Sheets-Sheet 2
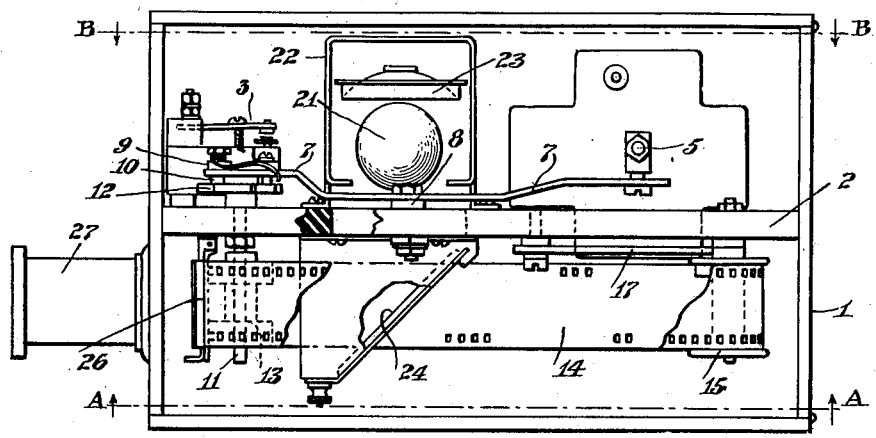
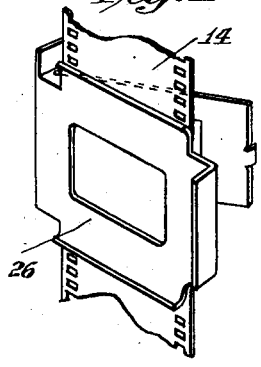
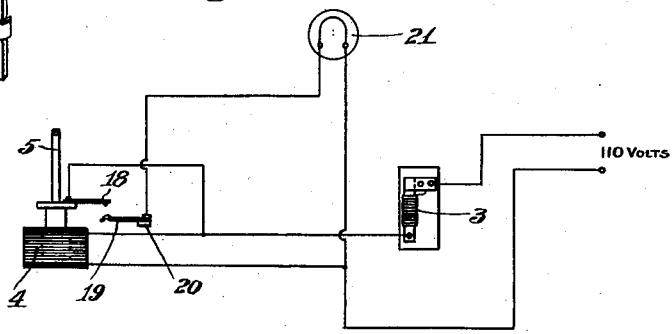
INVENTOR.
Charles E. Slaughter June 25, 1935.   C. E. SLAUGHTER   2,005,759
AUTOMATIC PROJECTOR
Filed May 4, 1931   4 Sheets-Sheet 3

Charles P. Slaughter
INVENTOR.

Patented June 25, 1935

2,005,759

UNITED STATES PATENT OFFICE 2,005,759

AUTOMATIC PROJECTOR

Charles E. Slaughter, Montclair, N. J.

Application May 4, 1931, Serial No. 534,819

1 Claim. (Cl. 88—28)

This invention relates to an automatic projector adapted to project images from a travelling film situated in the projector, such propulsion being secured by electrical means preferably through the agency of an electromagnet the current to which is supplied intermittently through a flasher or thermostatic control of a similar nature or other automatic make-and-break device, permitting the projection lamp to be shut off intermittently with consequent opportunity for cooling, as will be referred to more fully below.

The film used for the purpose may be of the ordinary standard moving picture film type and the pictures, photographs, emblems or legends thereon may be arranged in the position of the frames of normal moving picture film or they may be placed at right angles thereto, according to whether such film is used in a vertical or horizontal form of apparatus, as will be more fully hereinafter described. The film preferably is endless, that is, the two ends of the film are cemented or otherwise united to form a loop which can move progressively into the projection zone thereby permitting such apparatus to operate for long periods of time without attention, projecting on a suitable screen images of various sorts, particularly those having advertising value; since the projector is primarily designed for advertising purposes.

In the appended drawings, wherein the like reference characters represent like parts, vertical and horizontal types of a projector having different methods of film propulsion are illustrated.

Figures 1 to 5 inclusive depict an apparatus of the vertical film type equipped with an electromagnet directly actuating the film; normal jerkiness of the magnet armature being restrained by an oil bath damper which is an important adjunct in the prevention of breakage of film and for other reasons.

In these drawings Fig. 1 is a vertical section along the line A—A of Fig. 3.

Fig. 3 depicts a plan view of the apparatus with the top of the enclosing case or container removed.

Fig. 4 is a perspective of the film-gate or film-guide showing a portion of a film.

Fig. 5 is a wiring diagram which may be employed in the foregoing.

Figure 1:
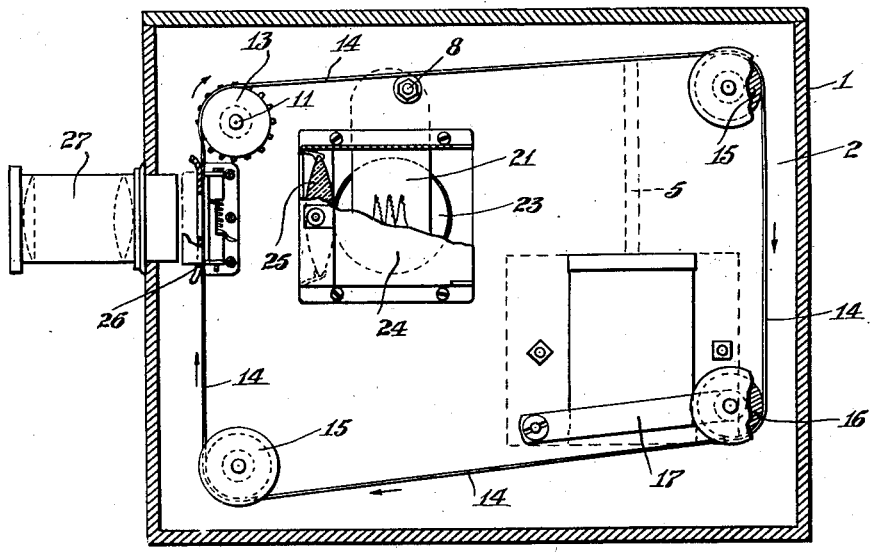
Figure 2:
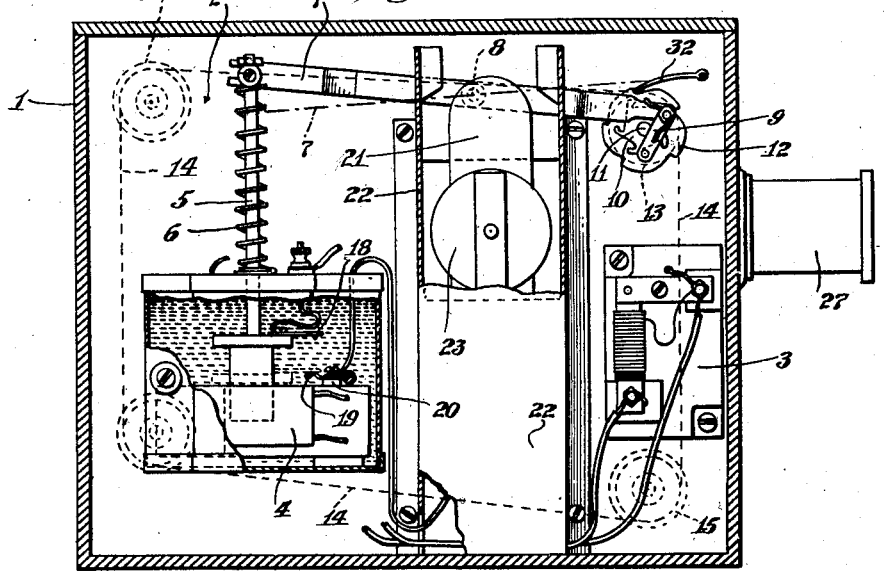
Fig. 2 is a vertical section along the line B—B of Fig. 3.
Figure 6:
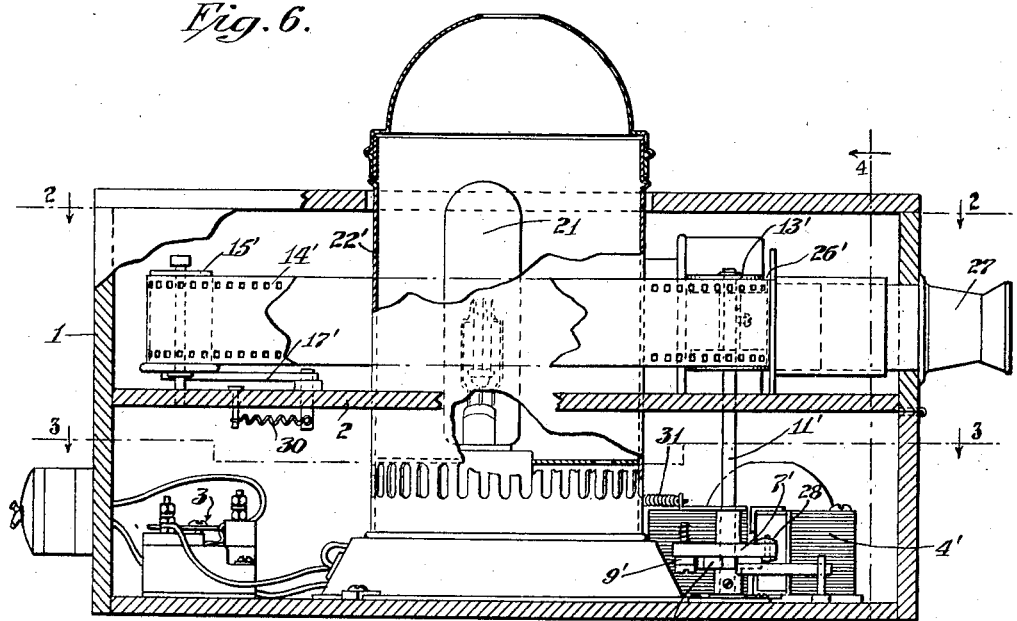

Figures 6 to 9 inclusive depict an apparatus of the horizontal film type, Fig. 6 being a horizontal longitudinal section showing part of the apparatus in elevation.

Figure 7:
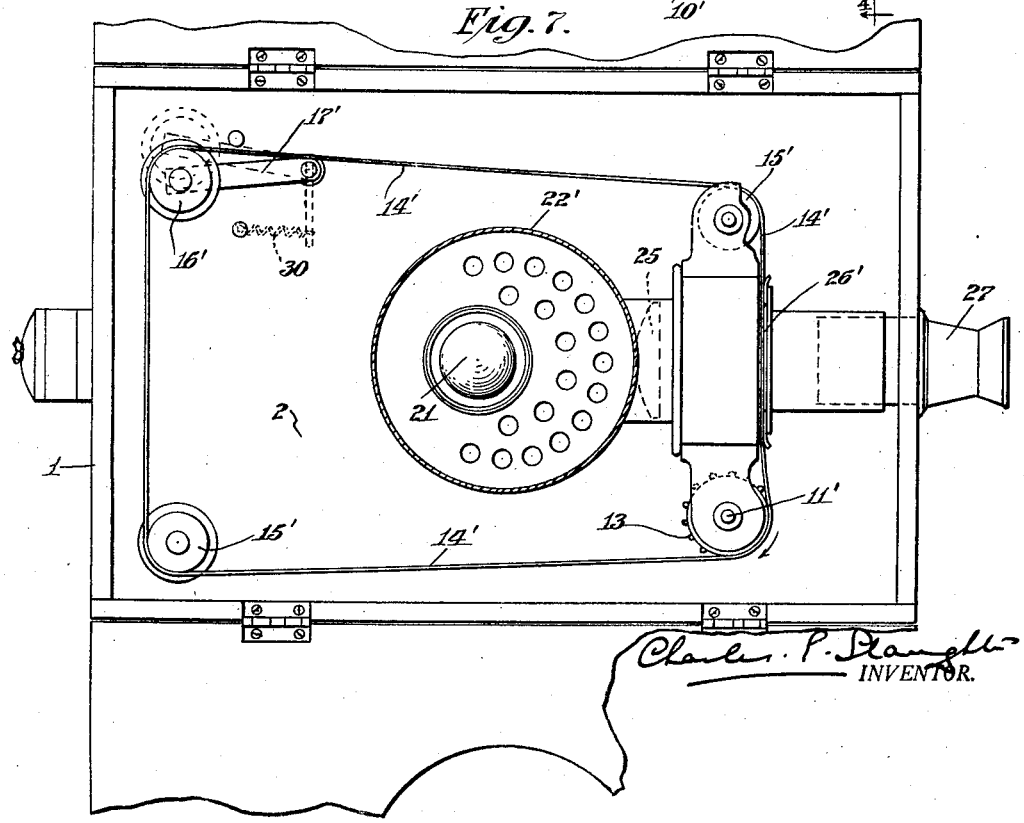

Fig. 7 is a plan view along the line 2—2 of Fig. 6.

Figure 8:
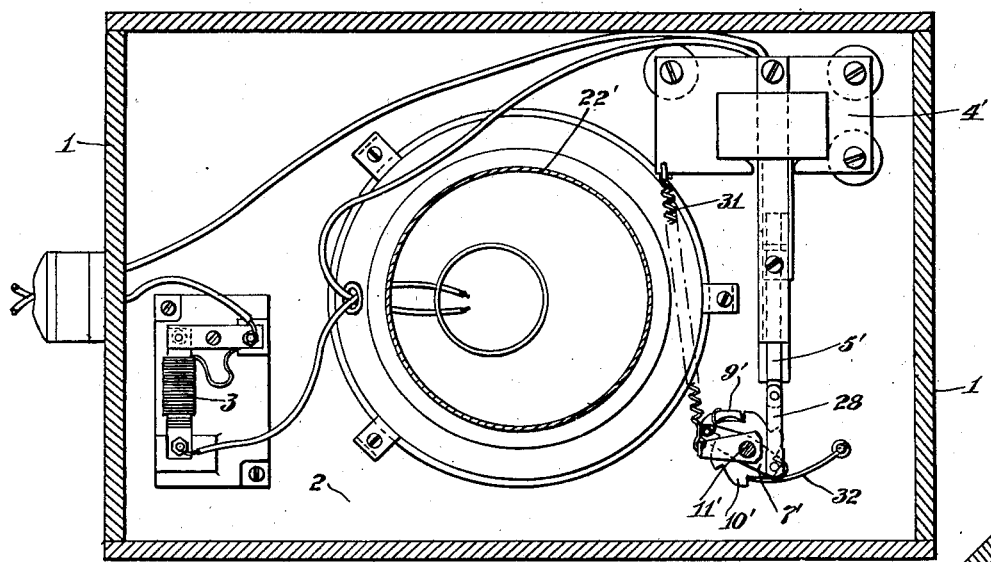

Fig. 8 is a view along the line 3—3 of Fig. 6.

Figure 9:
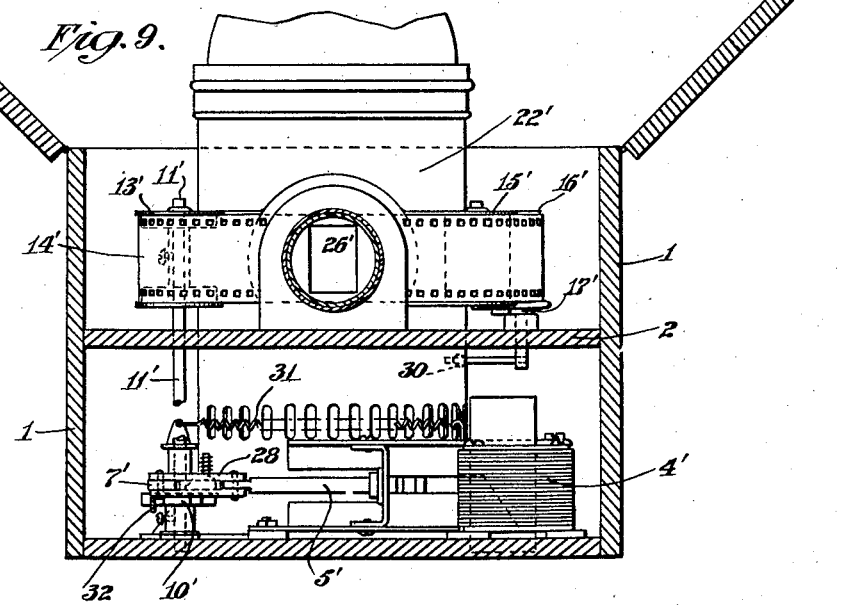

Fig. 9 is a section along the line 4—4 of Fig. 6.

In these illustrative drawings I shall first particularly refer to Figures 1 to 5:

The ventilated housing 1 contains the vertical or upright support termed the chassis 2 of asbestos board or other insulating material, upon which is mounted the operating mechanism. 3 is a thermostatic flasher, 4 is a solenoid type electromagnet, to which the shaft 5 is attached; this shaft carrying compression spring 6. The electromagnet device is immersed in a container filled with a suitable insulating oil as indicated on the drawings (see particularly Fig. 2). The rocker arm 7, is mounted on bearing 8 and carries pawl 9 which actuates the ratchet wheel 10 on the energizing of the electromagnet 4. Ratchet wheel 10 is keyed on shaft 11 which also carries backstop wheel 12 and film sprocket 13. 32 is a pawl to prevent backlash. 14 is an endless band of picture film. 15, 15 are two rollers and 16 is an idler roller mounted on swinging arm 17 and arranged to create a suitable tension of the film. On the armature of the magnet 4 is mounted a spring contact 18, and on the body of the magnet contact 19, mounted on insulated block 20. 21 is the projection lamp. 22 is the lamp housing. 23 is a concave reflecting mirror, 24 a 45° angle mirror or prism, 25 a condenser lens, 26 a film gate and 27 a projection lens. An opening is situate in the vertical supporting wall (chassis 2) to permit the illumination rays to pass to the mirror and then through film and projection lens.

The method of operation is as follows. When the current is turned on, the thermostatic flasher 3 heats up and closes the electric circuit, allowing the current to flow through the coil of the electromagnet 4. As the armature is drawn into the magnetic field, the shaft 5 which is attached to the armature, and is also hinged to the rocker arm 7, is drawn down, thus compressing the spring 6. Since, however, the rocker arm is mounted on the bearing 8 the pawl 9 is raised as the armature moves down, and, engaging with the tooth of the ratchet wheel 10, causes the ratchet wheel 10 to actuate the film sprocket the distance of one frame. This ratchet wheel 10 and the film sprocket 13, it should be noted are both keyed to the shaft 11, hence the film sprocket 13 moves a predetermined degree with each impulse and so shifts the film 14 one frame.

In other words the movement is adjusted so that as the solenoid armature of the magnet moved from the "open" to the closed position, one complete frame of the film is moved into position in the gate 26. Just before the armature of the magnet 4 comes to rest in the magnetic field the spring contact 18 closes an electrical circuit with the fixed arm 19, and since this spring contact 18 is also in electrical contact with one end of the magnet coil, current flows from arm 18 to arm 19, and from there to the projector lamp 21. (See electrical diagram Fig. 5.) When the flasher "breaks circuit" the current is cut off, the lamp goes "out" and the magnetic field is destroyed. The compression spring 6 then pushes the shaft 5 and the armature of the magnet to the open position. The rocker arm 7 moves about bearing 8 lowering the pawl 9, and the cycle is complete. The operation repeats itself as soon as the flasher 3 heats up again to form the new contact. During the brief interval the lamp is extinguished in the cycle, cooling sets in, an effect which is enhanced by allowing a free flow of air through the housing. Cooling is of great importance as will be later explained. The cooling period when the light is out may last only a few seconds in each cycle yet this suffices to secure ample cooling action.

Due to the damping effect of the oil bath, this method is particularly well adapted to A. C. current, since the oil tends to cut down the "alternating current hum" that might otherwise be objectionable. Moreover, the damping effect of the oil bath prevents any sudden jerking of the film, with consequent likelihood of breakage, as the first surge of the current flows through the magnet. Still another advantage of this method is the fact that the flasher contact points are only called upon to carry the current of the magnet in the original closing of the circuit. The contact for the lamp is carried separately by the contacts within the magnet housing.

Figures 6 to 9 (horizontal type of machine) show a modified mechanism. The housing 1 contains chassis 2. 3 is a thermostatic flasher, 4' is a solenoid type electromagnet, 5' is a shaft bolted to the armature of the solenoid. 28 is a connecting rod from shaft 5' to rocker arm 7', which carries pawl 9'. Ratchet wheel 10' is mounted on shaft 11' which also carries film sprocket 13'. 14' is an endless band of picture film. 15' are two rollers, and 16' is an idler roller mounted on swinging arm 17' kept under tension by spring 30. 31 is a tension spring, 32 a pawl to prevent backlash, 21 is a lamp, 22' a lamp housing, 25 a condenser lens, 26' a film gate and 27 a projection lens.

The method of operation is as follows. When the current is turned on, the thermostat flasher 3 heats up and closes the electric circuit allowing the current to flow through the coil of the electromagnet 4', and also through the projection lamp 21. As the armature is drawn into the magnetic field, the shaft 5', through the connecting rod 28, moves the rocker arm 7' against the tension of the spring 31. The pawl 9', mounted on the rocker arm 7', slides over the teeth of the ratchet wheel 10' without engaging them. While this movement is going on, the image of the film is being projected on the screen. When the flasher "breaks circuit" the current is cut off, the lamp is extinguished, and the magnetic field is destroyed. The tension spring 31 is then able to act on the racker arm 7', and the pawl 9' engages with the teeth of the ratchet wheel 10' causing it to revolve as the armature of the magnet returns to the open position. As the ratchet wheel 10' moves round, it also revolves the film sprocket 13', since it is mounted on the same shaft 11', which in turn moves the film so that a new frame is brought into the gate, ready for projection when the flasher once more heats up and starts the cycle over again.

The sudden jerk, brought about by the current surging through the magnet coil, is not transmitted to the film, since the actual movement of the film is caused by the steady pull of the tension spring. There is, moreover, no movement of the film while the light is on.

The use of a thermostatic flasher serves to greatly increase the useful life of the lamp, since the lamp has the opportunity to cool off every few seconds. Moreover, since the lamp is mounted in a tubular housing with ample ventilating holes at top and bottom (see Figs. 6 and 7) a considerable draft of air surges up past the lamp not only while it is "on" but also while it is still hot but not lighted. This quite strong convection of air avoids the artificial draft which is usually needed when the lamp is "on" continuously.

Moving picture film or analogous film, whether of the nitrocellulose or the acetate type, is quickly embrittled if maintained above a certain temperature. The maintenance of the light in full operation would generate so much heat that cooling below the critical temperature of film decay would be difficult. The present invention involving intermittent operation provides an automatic projector of simple and cheap construction in which the development of heat to or above the critical temperature of film decay may be prevented without the employment of expensive and clumsy ventilating and cooling accessory apparatus.

It will be evident that by the employment of what I have termed a "thermostatic current interrupter", "thermostat circuit breaker", "thermostat flasher", and "thermostatic flasher", coupled with the mechanism illustrated herein that the current may be interrupted periodically for a sufficient length of time to allow cooling to occur especially with a loose fitting or ventilated housing such as I preferably use herein. It is within the province of this invention to organize the automatic projector to break the current for a length of time adequate to maintain the desired degree of temperature control, that is, to keep the temperature below that point at which the film disintegrates rapidly. Of course all film in constant use in this way is subject to considerable wear and has to be replenished from time to time but what I seek to avoid by the practice of the present invention is, as indicated, that undesirable overheating which tends to convert ordinary high viscosity, tough celluloid nitrocellulose into a low viscosity, brittle, fragile form, thus aging the film rapidly and shortening its life greatly beyond the normal duration. In this manner I am able to produce an automatic projector which can be kept in operation continuously (that is with continuous periodicity) without any overheating which signifies rapid film decay.

What I claim is:

In a projecting machine wherein a transparency is intermittently advanced through a step by step movement intermediate a projecting lens and a source of illumination, a pawl and ratchet mechanism for intermittently advancing the transparency, an electromagnet, an armature movable by said electromagnet to actuate said pawl and ratchet mechanism, an electrical circuit in which the electromagnet is located, a second electrical circuit connected to said first circuit and in parallel therewith and including said source of illumination, a normally open switch in said second circuit operable by the movements of the said armature to close said second circuit, and a thermostatic flasher in series with said circuits.

CHARLES E. SLAUGHTER.